United States Patent [19]
Whitney

[11] 3,949,215
[45] Apr. 6, 1976

[54] LAMP ASSEMBLY

[75] Inventor: George Joseph Whitney, Walsall, England

[73] Assignee: The Lucas Electrical Company Limited, Birmingham, England

[22] Filed: Jan. 15, 1975

[21] Appl. No.: 541,142

[30] Foreign Application Priority Data
Jan. 29, 1974 United Kingdom............... 3985/74

[52] U.S. Cl. ...... 240/44.1; 240/41.25; 240/41.35 A
[51] Int. Cl.² .......................................... F21V 7/00
[58] Field of Search ....... 240/7.1 C, 41.25, 41.35 R, 240/41.35 A, 41.35 B, 41.35 E, 41.6, 44, 44.1, 44.2, 57

[56] References Cited
UNITED STATES PATENTS

| | | | |
|---|---|---|---|
| 3,594,569 | 7/1971 | Cranmore | 240/44 |
| 3,622,788 | 11/1971 | Cibie | 240/41.25 X |
| 3,628,852 | 12/1971 | Snaper et al. | 240/44.1 X |
| 3,870,876 | 3/1975 | Puyplat | 240/41.35 A |

FOREIGN PATENTS OR APPLICATIONS

| | | | |
|---|---|---|---|
| 93,289 | 1/1969 | France | 240/41.35 R |

Primary Examiner—Richard M. Sheer
Attorney, Agent, or Firm—Holman & Stern

[57] ABSTRACT

A lamp assembly comprises a hollow body in which first and second reflectors are mounted. The hollow body is mounted on a support plate through the intermediary of three adjusting screw devices, to enable the body to be tilted relative to the plate. The second reflector is mounted in the body by means of a flexible support and a pair of spaced adjusting screws which enable the second reflector to be selectively adjusted both in the horizontal plane and in the vertical plane relative to the body.

4 Claims, 3 Drawing Figures

LAMP ASSEMBLY

This invention relates to lamp assemblies.

According to the present invention, there is provided a lamp assembly comprising a hollow body, first and second reflectors carried by said body, a support member, first means adjustably mounting the body on the support member, and second means adjustably mounting the second reflector relative to the body for selective movement in two mutually inclined planes.

In one embodiment, the first adjustable mounting means comprises at least one adjusting screw, the or each adjusting screw being connected with one of the body and the support member through the intermediary of a ball and socket joint and being screw connected with the other of the body and the support member.

However, in a preferred embodiment, the first adjusting means comprises at least one adjusting screw, the or each adjusting screw being connected with one of the body and the support member through the intermediary of a pivot joint arrangement and being screw connected with the other of the body and the support member, the or each pivot joint arrangement comprising a slotted member and an element having a recess with curved side walls, said element being engaged with the slotted member whereby the curved side walls permit relative pivotal movement between the slotted member and the element.

Conveniently, the second adjustable mounting means includes a flexible element engaged with the body and with the second reflector, and a pair of adjusting screws connected between the body and the second reflector.

Embodiments of the present invention will now be described, by way of example, with reference to the accompanying drawings, in which.

Figure 1:
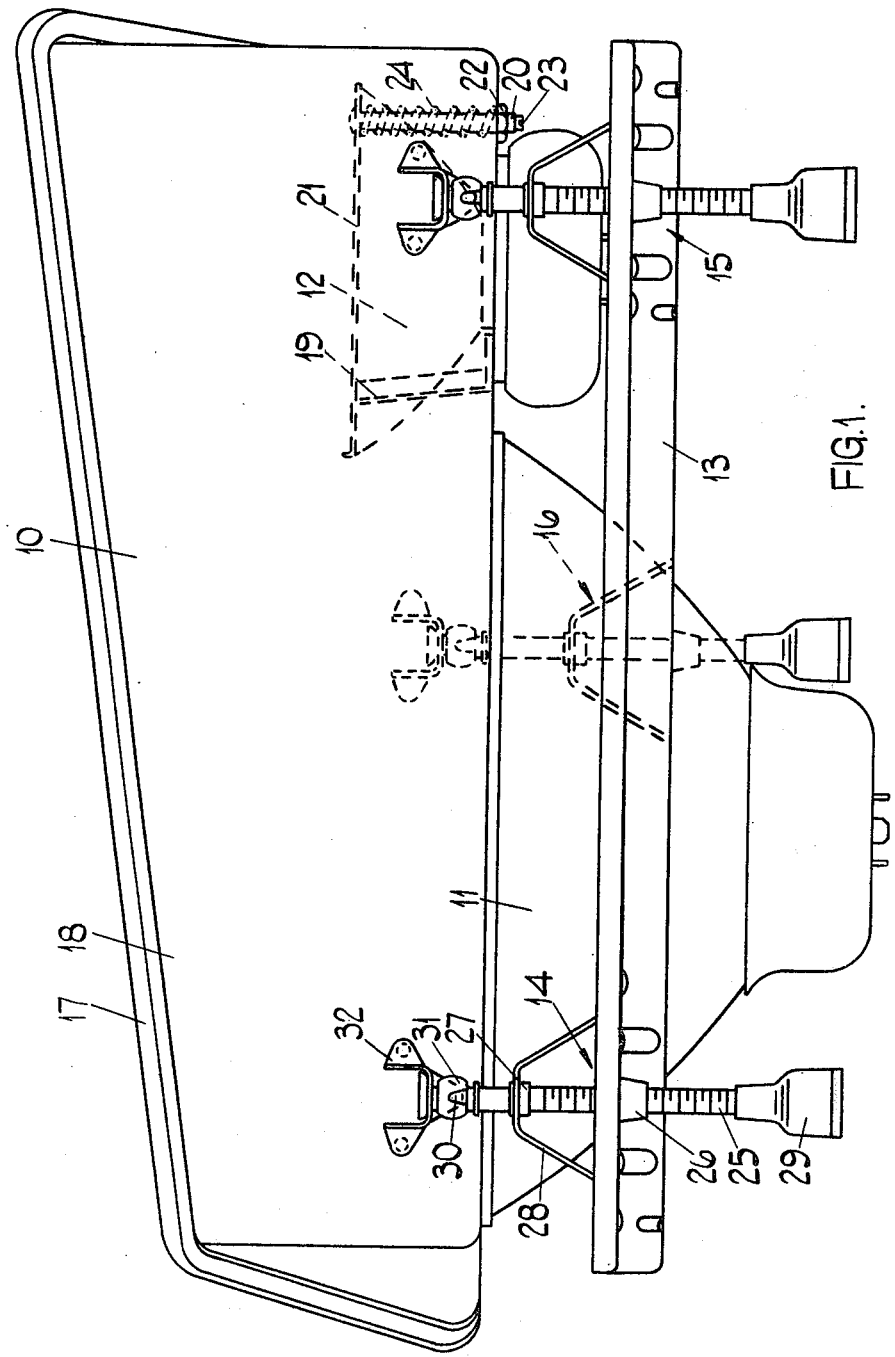
FIG. 1 is a plan view of a lamp assembly according to the present invention.
Figure 2:
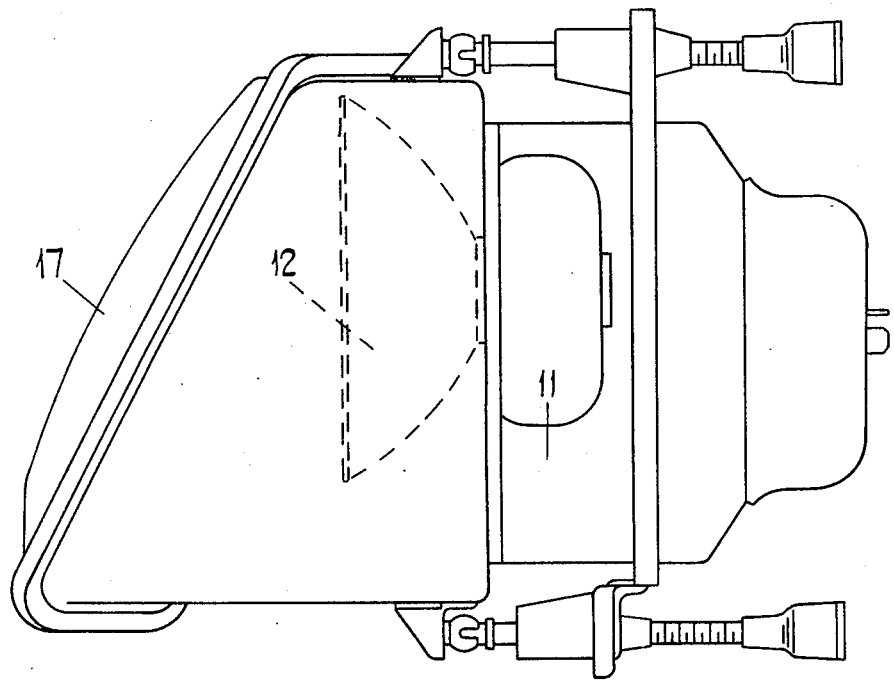
FIG. 2 is a side view of the lamp assembly of FIG. 1.

Referring to FIGS. 1 and 2 of the drawings, the lamp assembly illustrated therein comprises a hollow body 10, first and second reflectors 11 and 12 respectively carried by said body 10, a support plate 13 and three identical adjusting screw devices 14, 15 and 16 which serve to mount the body 10 adjustably relative to the support plate 13.

The body 10 includes a transparent lens element 17 closing the front of a dished housing 18 also forming part of the body 10. The first reflector 11 is adhesively secured to the body 10 and projects rearwardly thereof to extend through an aperture (not shown) in the support plate 13. The second reflector 12 is disposed within the body 10 and is adjustably mounted with respect to the body 10. This adjustable mounting is effected by means of a flexible bracket 19 secured at one end to the second reflector 12 and at the other end to the housing 18, and a pair of adjusting screws 20 (only one shown). Each adjusting screw 20 is rotatably mounted in a rim 21 on the second reflector 12 and engages with a nut 22 fixed on the outside of housing 18. Each adjusting screw 20 extends through the housing 18 and its outer end is slotted at 23 to enable rotation thereof without having to gain access to the interior of the body 10. Each adjusting screw 20 is surrounded by a compression spring 24 lodged between the rim 21 and the dished housing 18. The two adjusting screws 20 and the flexible bracket 19 are angularly spaced apart about the reflector 12, so that adjustment of one screw 20 (the one shown in FIG. 1) tilts the reflector 12 about flexible bracket 19 in the horizontal plane and the other screw 20 (the one not shown) tilts the reflector 12 about flexible bracket 19 in the vertical plane, such tilting movement of the reflector 12 taking place relative to body 10. The compression spring 24 urges the rim 21 of the reflector 12 against the head of the respective adjusting screw 20.

The screw adjusting devices 14 and 15 are provided at opposite ends of one side of the body 10 whilst the adjusting screw device 16 is provided on the opposite side of the body 10 intermediate the ends thereof. The three adjusting screw devices 14, 15 and 16 are identical and the construction of these will be described hereinafter with reference to adjusting screw device 14. Device 14 comprises an adjusting screw 25 engaged with an internally screw threaded bush 26 secured to the support plate 13. The adjusting screw 25 passes through a further bush 27 supported in a bracket 28 secured to the support plate and extending towards the body 10. At one end of the adjusting screw 25 which lies on the opposite side of support plate 13 to body 10 there is provided a knurled knob 29 whereby the adjusting screw 25 can be manually rotated. At the opposite end of the adjusting screw 25 to the knob 29, there is provided a ball 30 which engages with a snap-action in a socket 31 carried by a bracket 32 riveted onto the dished housing 18. The adjusting screw 25 is freely rotatable relative to the further bush 27. Rotation of the knob 29 causes it to be moved axially because of its co-operation with screw threaded bush 26. Such axial movement of the screw 25 causes the body 10 to be moved relative to the support plate 13.

The lamp assembly described above is for use as a vehicle headlamp and the support plate 13 is adapted to be bolted onto the front of a motor vehicle. Adjustment of the body 10 and thus of the first and second reflectors 11 and 12 in unison can be effected by appropriate adjustment of the knobs 29 of adjusting screw devices 14, 15 and 16. The joints formed by the ball 30 and respective sockets 31 permits pivotal movement of the body 10 thereabout.

Additionally, as described above, the second reflector 12 can be adjusted relative to the body 10 and relative to the first reflector 11 by rotation of one or both of the adjusting screws 20 by engaging a suitable tool in one or both slots 23 to effecting tilting of reflector 12 in the vertical plane and/or the horizontal plane.

Figure 3:
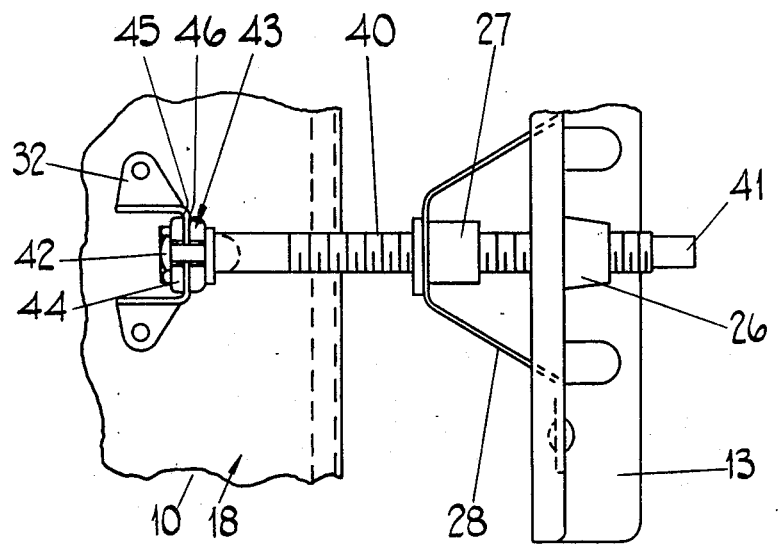
FIG. 3 is a side view showing a modification of part of the lamp assembly of FIGS. 1 and 2.

Referring now to FIG. 3, there is illustrated an alternative form of adjusting screw device which is intended to replace the adjusting screw devices 14, 15 and 16 described hereinabove with reference to FIGS. 1 and 2. In this embodiment, the adjusting screw device comprises an adjusting screw 40 which, as before, is engaged with the internally screw threaded bush 26 and further bush 27 mounted on the bracket 28 fixed to the support plate 13. The adjusting screw 40 has, at its end which lies on the opposite side of support plate 13 to body 10 a non-circular end 41 adapted to receive a knob similar to knob 29. At its opposite end, the adjusting screw 40 has engaged therewith a bolt 42 upon which is mounted a bush 43 defined by two annular elements 44. The elements 44 have mutually facing curved ends 45 which together define an annular recess 46 in the bush 43. Instead of being provided with the socket 31, the bracket 32 is provided with a slot therein with which bush 43 co-operates so that the edges of the bracket 32 on either side of the slot engage in the recess 46. The curved sides of the slot 46 as defined by the curved ends 45 permit limited pivotal movement of the bracket 32 relative to the bush 43 and therefore relative to the adjusting screw 40. Apart from this difference, the adjusting screw device of FIG. 3 operates in the same way as the adjusting screw device 14 of FIGS. 1 and 2.

In the above two described embodiments, the reflectors 11 and 12 are designed to accept quartz halogen filaments although it is within the scope of the present invention to provide conventional tungsten filament bulbs in the reflector.

I claim:

1. A lamp assembly comprising a hollow body including a lens element, first and second reflectors carried by said body, said lens element overlying both of said first and second reflectors, a support member, first means adjustably mounting the body on the support member, and second means adjustably mounting the second reflector to the body for selective movement in two mutually inclined planes relative to the body.

2. The assembly according to claim 1, wherein, said second adjustable mounting means includes a flexible bracket engaged with said body and said second reflector, and a pair of adjusting screws connected between said body and said second reflector, the arrangement being such that rotation of either one or both of said adjusting screws causes movement of said second reflector relative to said body by flexing of said bracket.

3. The assembly according to claim 2, wherein said second adjustable mounting means further includes a compression spring mounted on each said adjusting screw and acting between said second reflector and said body.

4. The assembly according to claim 1, wherein said first adjusting means comprises a pivot joint arrangement which is connected with one of said body and said support member and at least one adjusting screw which is connected with the other of said body and said support member, said pivot joint arrangement comprising a slotted member and an element having a recess with curved side walls, said element being engaged with said slotted member whereby said curved side walls permit relative pivotal movement between said slotted member and said element.

* * * * *